United States Patent
Fan

(10) Patent No.: US 10,616,778 B2
(45) Date of Patent: Apr. 7, 2020

(54) METHOD, DEVICE AND TERMINAL FOR REALIZING COEXISTENCE OF MIRACAST AND HOTSPOT

(71) Applicant: ZTE CORPORATION, Guangdong (CN)

(72) Inventor: Ruitao Fan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 63 days.

(21) Appl. No.: 15/755,331

(22) PCT Filed: Oct. 19, 2015

(86) PCT No.: PCT/CN2015/092232
§ 371 (c)(1),
(2) Date: Feb. 26, 2018

(87) PCT Pub. No.: WO2016/145846
PCT Pub. Date: Sep. 22, 2016

(65) Prior Publication Data
US 2018/0279138 A1  Sep. 27, 2018

(30) Foreign Application Priority Data
Aug. 25, 2015 (CN) .......................... 2015 1 0528010

(51) Int. Cl.
*H04W 24/02* (2009.01)
*H04W 4/00* (2018.01)
*H04L 29/08* (2006.01)
*H04W 84/12* (2009.01)

(52) U.S. Cl.
CPC .......... *H04W 24/02* (2013.01); *H04L 67/104* (2013.01); *H04L 67/34* (2013.01); *H04W 4/00* (2013.01); *H04W 84/12* (2013.01)

(58) Field of Classification Search
CPC ........... H04W 4/00; H04L 67/38; H04L 43/12
USPC .......................... 370/252–468; 455/456, 422
See application file for complete search history.

(56) References Cited

U.S. PATENT DOCUMENTS

| | | | |
|---|---|---|---|
| 2013/0346562 A1* | 12/2013 | Kim ...................... | H04L 65/608 709/219 |
| 2014/0214261 A1* | 7/2014 | Ramamoorthy ....... | G07C 5/008 701/31.5 |
| 2016/0316488 A1* | 10/2016 | Ko ..................... | H04W 52/0216 |

\* cited by examiner

*Primary Examiner* — Iqbal Zaidi
(74) *Attorney, Agent, or Firm* — Nath, Goldberg & Meyer; Joshua B. Goldberg; Daniel Bissing

(57) ABSTRACT

A method, a device and a terminal for realizing coexistence of Miracast and Hotspot are provided. The method for realizing coexistence of Miracast and Hotspot includes steps of: receiving a coexistence instruction; judging whether Miracast of a terminal is turned off or turned on; judging whether Hotspot of the terminal is turned on or turned off in a case where Miracast of the terminal is turned off; turning off Hotspot of the terminal and then turning on Miracast of the terminal in a case where Hotspot of the terminal is turned on, and directly turning on Miracast of the terminal in a case where Hotspot of the terminal is turned off; turning on Hotspot of the terminal after turning on Miracast of the terminal.

8 Claims, 5 Drawing Sheets

METHOD, DEVICE AND TERMINAL FOR REALIZING COEXISTENCE OF MIRACAST AND HOTSPOT

This is a National Phase Application filed under 35 U.S.C. 371 as a national stage of PCT/CN2015/092232, filed Oct. 19, 2015, an application claiming the benefit of Chinese Application No. 201510528010.7, filed Aug. 25, 2015, the content of each of which is hereby incorporated by reference in its entirety.

TECHNICAL FIELD

The present disclosure relates to the field of wireless communication, and in particular relates to a method, a device and a terminal for realizing coexistence of Miracast and Hotspot.

BACKGROUND

Miracast is also called as WIFI Display, and is a Wi-Fi CERTIFIED Miracast™ certification project, the start of which was announced by Wi-Fi Alliance on Sep. 19, 2012. A Miracast device provides simplified discovery and setting so that a user can rapidly transmit videos between devices. Miracast users can browse photos shot by smart phones on a big TV screen to their heart's content, sharing a notebook computer screen in real time through a projector in a conference room, or watch live TV program of a home TV set-top box on a tablet computer. Miracast establishes a connection by Wi-Fi CERTIFIED Wi-Fi Direct™, thus it is unnecessary to access any Wi-Fi network.

Hotspot is a public place, where a wireless LAN (Wi-Fi) is provided for accessing Internet service.

With developing of wireless technology, almost all electronic product users want to interact with other devices through a wireless connection technology so as to easily share information on a terminal with others, which requires the terminal to be able to achieve more wireless services and various wireless technologies to be able to interconnect and coexist. It is known that, the Miracast device provides simplified discovery and setting so that the user can rapidly transmit and share information between devices, and Hotspot is commonly used for providing an access through an access point (AP). If both of Miracast and Hotspot coexist on a same terminal, the terminal can simultaneously communicate data with other devices and provide the access through the access point. However, due to limitations of chips, software, etc. in relevant technologies, relevant terminals and devices have not realized two functions of Miracast and Hotspot simultaneously.

SUMMARY

The present disclosure provides a method, a device and a terminal for realizing coexistence of Miracast and Hotspot, and a problem to be solved by some implementations of the present disclosure is that Miracast and Hotspot cannot coexist in related technologies.

In an aspect, the present disclosure provides a method for realizing coexistence of Miracast and Hotspot, the method includes steps of: receiving a coexistence instruction; judging whether Miracast of a terminal is currently turned off or turned on; in a case where Miracast of the terminal is currently turned off, judging whether Hotspot of the terminal is currently turned on or turned off; in a case where Hotspot of the terminal is currently turned on, turning off Hotspot of the terminal and then turning on Miracast of the terminal, and in a case where Hotspot of the terminal is currently turned off, directly turning on Miracast of the terminal; turning on Hotspot of the terminal after turning on Miracast of the terminal.

In an embodiment of the present disclosure, in a case where Miracast of the terminal is currently turned on, judging whether Hotspot of the terminal is currently turned off, and in a case where Hotspot of the terminal is currently turned off, turning on Hotspot of the terminal.

In an embodiment of the present disclosure, the step of turning on Hotspot of the terminal includes: building a peer-to-peer network group through a service set identifier and a password to achieve an access of a wireless access point.

In an embodiment of the present disclosure, the method further includes: before turning on Miracast of the terminal, judging whether WIFI of the terminal is currently turned off, and in a case where WIFI of the terminal is currently turned off, turning on WIFI of the terminal.

In another aspect, the present disclosure provides a device for realizing coexistence of Miracast and Hotspot, the device includes: an instruction receiving module, a first judging module, a second judging module, a first processing module, a second processing module and a third processing module, the instruction receiving module is configured to receive a coexistence instruction, the first judging module is configured to judge whether Miracast of a terminal is currently turned off or turned on upon receiving the coexistence instruction by the instruction receiving module, the second judging module is configured to judge whether Hotspot of the terminal is currently turned on or turned off in a case where Miracast of the terminal is judged to be turned off by the first judging module, the first processing module is configured to turn on Miracast of the terminal after turning off Hotspot of the terminal in a case where Hotspot of the terminal is judged to be currently turned on by the second judging module, the second processing module is configured to directly turn on Miracast of the terminal in a case where Hotspot of the terminal is judged to be currently turned off by the second judging module, the third processing module is configured to turn on Hotspot of the terminal after Miracast of the terminal is turned on by the first processing module or the second processing module.

In an embodiment of the present disclosure, the device for realizing coexistence of Miracast and Hotspot further includes a third judging module and a fourth processing module, the third judging module is configured to judge whether Hotspot of the terminal is turned off in a case where Miracast of the terminal is judged to be turned on by the first judging module, the fourth processing module is configured to turn on Hotspot of the terminal in a case where Hotspot of the terminal is judged to be turned off by the third judging module.

In an embodiment of the present disclosure, the third processing module or the fourth processing module is configured to build a peer-to-peer network group through a service set identifier and a password to achieve an access of a wireless access point.

In an embodiment of the present disclosure, the device for realizing coexistence of Miracast and Hotspot further includes a fifth processing module configured to turn on WIFI of the terminal before Miracast of the terminal is turned on by the first processing module or the second processing module in a case where WIFI of the terminal is currently turned off.

In still another aspect, the present disclosure provides a terminal for realizing coexistence of Miracast and Hotspot, and the terminal includes the device for realizing coexistence of Miracast and Hotspot.

Technical solutions of the present disclosure have following beneficial effects.

With the method, the device and the terminal for realizing coexistence of Miracast and Hotspot provided by the present disclosure, upon receiving the coexistence instruction, a current state of Miracast of the terminal is first judged, and Hotspot of the terminal is turned on in a case where Miracast of the terminal is turned on, by a one-key switch design, in different situations, the terminal receives a trigger instruction to determine a current situation of the terminal and freely switch on/off states of Miracast and Hotspot so as to realize coexistence of Miracast and Hotspot, which simplifies operations so that it is convenient for users to use, improving user's experiences and also making actual coexistence effects better.

DETAILED DESCRIPTION

Technical solutions of the present disclosure are further illustrated in detail by embodiments in conjunction with accompanying drawings.

Figure 1:
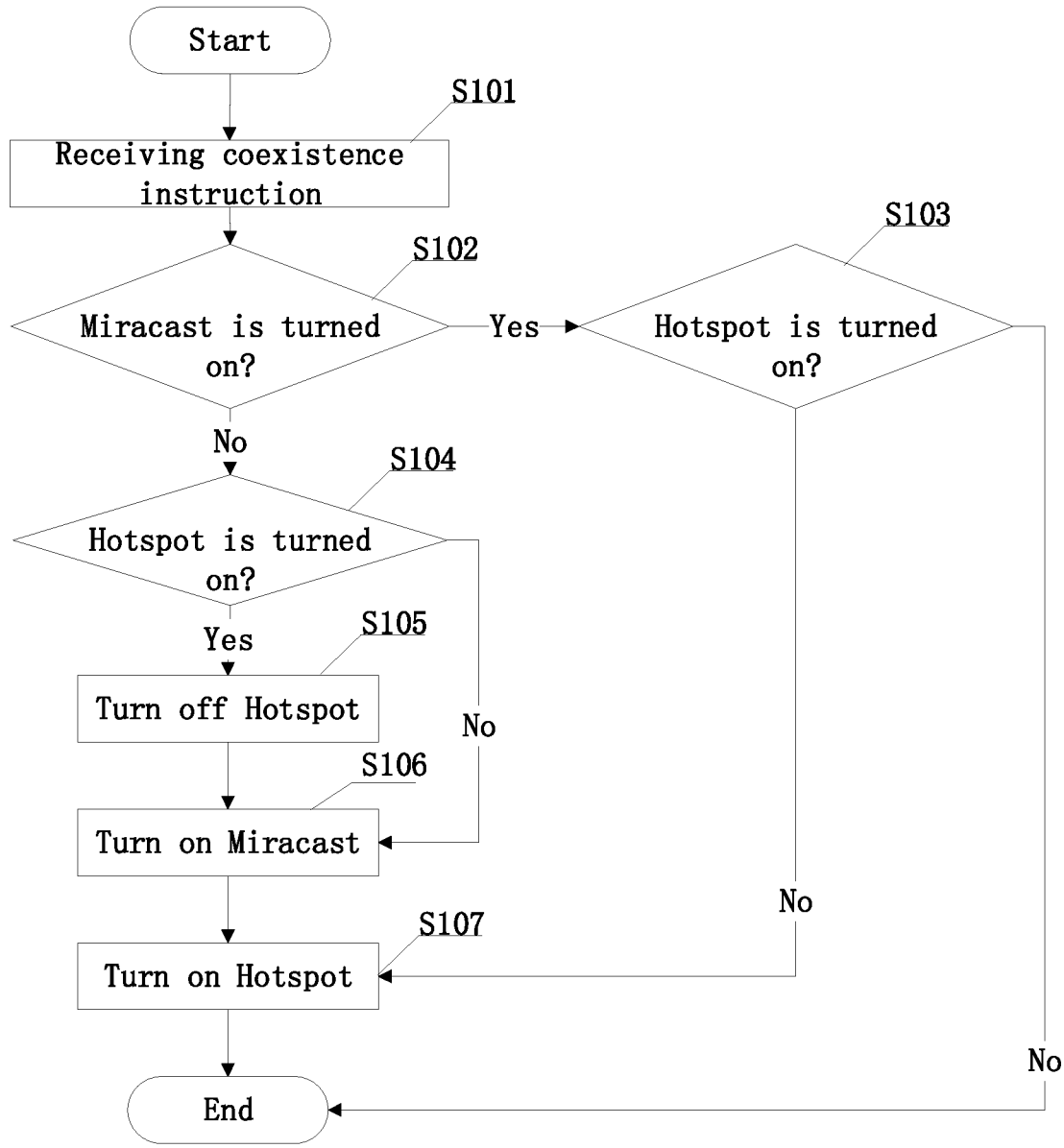
FIG. 1 shows a flowchart of a method for realizing coexistence of Miracast and Hotspot in an embodiment of the present disclosure.

In order to achieve coexistence of Miracast and Hotspot to improve user's experiences, an embodiment of the present disclosure provides a method for realizing coexistence of Miracast and Hotspot, as shown in FIG. 1, the method includes following steps: at S101, receiving a coexistence instruction; at S102, judging whether Miracast of a terminal is turned on or turned off, in a case where Miracast of the terminal is judged to be turned on, proceeding to S103, and in a case where Miracast of the terminal is judged to be turned off, proceeding to S104; at S103, judging whether Hotspot of the terminal is turned on or turned off, in a case where Hotspot of the terminal is judged to be turned on, ending, and in a case where Hotspot of the terminal is judged to be turned off, proceeding to S107; at S104, judging whether Hotspot of the terminal is turned on or turned off, in a case where Hotspot of the terminal is judged to be turned on, proceeding to S105, and in a case where Hotspot of the terminal is judged to be turned off, proceeding to S106; at S105, turning off Hotspot of the terminal; at S106, turning on Miracast of the terminal; at S107, turning on Hotspot of the terminal, and then ending.

The coexistence instruction at S101 refers to an instruction that is generated by a user triggering a corresponding interface, that is, a corresponding user interface (UI) may be provided for the terminal so that the user can trigger a corresponding coexistence instruction on the user interface. Upon receiving the coexistence instruction, S102 through S107 are triggered to judge a current situation of the terminal, so that on/off states of Miracast and Hotspot of the terminal can be freely switched to achieve coexistence of Miracast and Hotspot.

Figure 2:
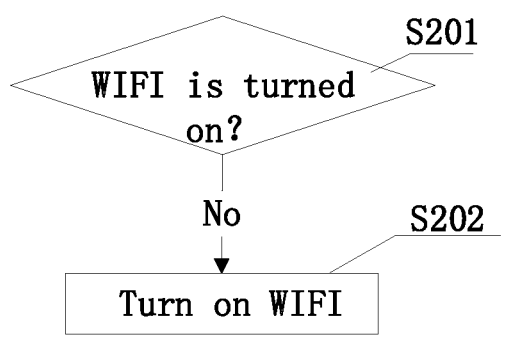
FIG. 2 shows a flowchart of judging whether WIFI of a terminal is turned on before turning on Miracast of the terminal in an embodiment of the present disclosure.

In some implementations, the method for realizing coexistence of Miracast and Hotspot further includes steps: at S201, before turning on Miracast of the terminal at S106, judging whether WIFI of the terminal is turned on or turned off; at S202, in a case where WIFI of the terminal is judged to be turned off, turning on WIFI of the terminal, as shown in FIG. 2.

It should be understood that, the step of turning on Miracast of the terminal specifically includes: establishing a WIFI connection of P2P through WIFI, and forbidding WIFI scanning after Miracast is turned on.

Turning on Hotspot of the terminal at S107 includes: building a peer-to-peer network group through a service set identifier and a password to achieve an access of a wireless access point.

Figure 3:
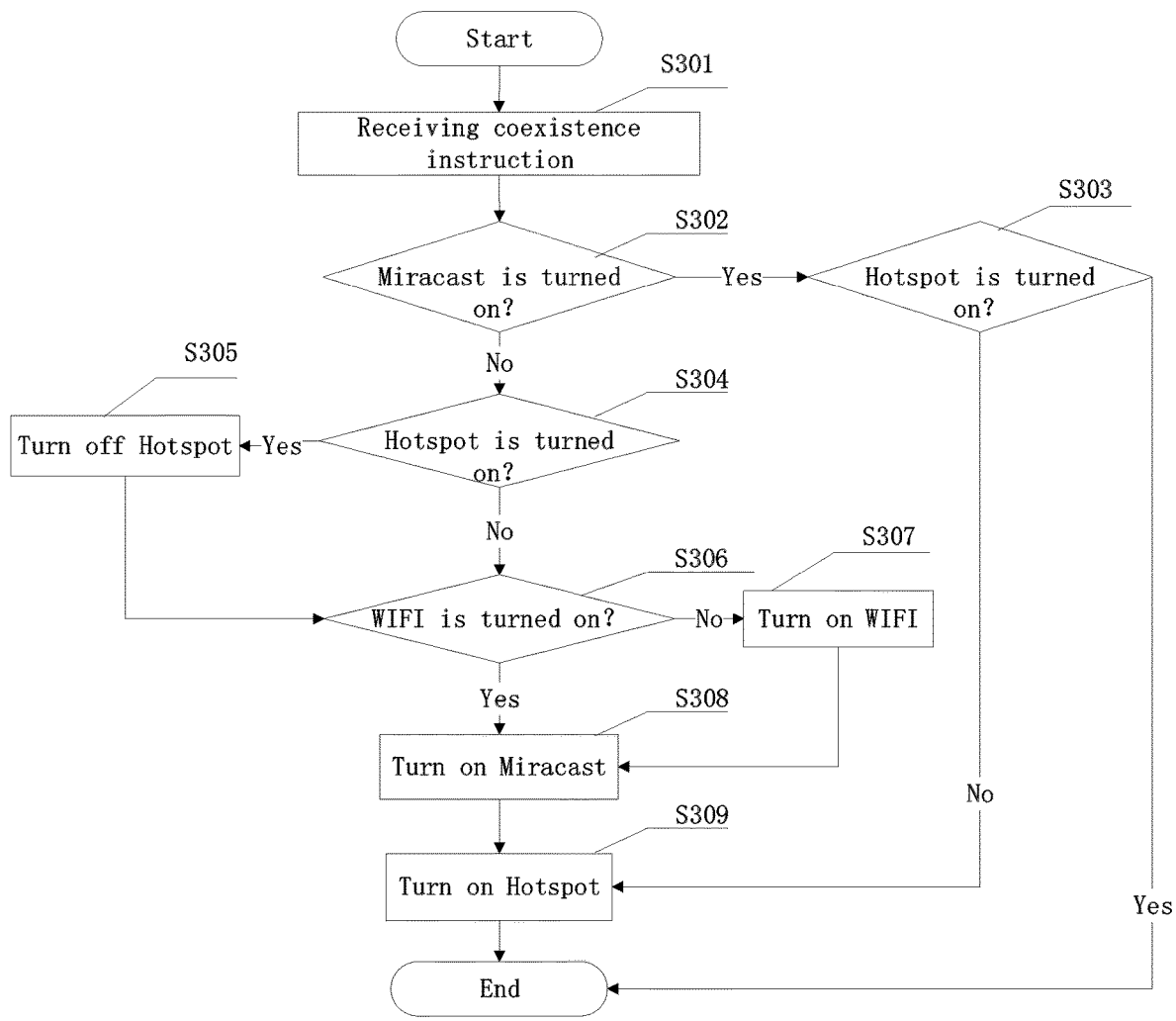
FIG. 3 shows another flowchart of the method for realizing coexistence of Miracast and Hotspot in an embodiment of the present disclosure.

FIG. 3 shows a specific procedure of the method for realizing coexistence of Miracast and Hotspot, and as shown in FIG. 3, the method includes steps: at S301, receiving a coexistence instruction; at S302, judging whether Miracast of a terminal is turned on or turned off, in a case where Miracast of the terminal is judged to be turned on, proceeding to S303, and in a case where Miracast of the terminal is judged to be turned off, proceeding to S304; at S303, judging whether Hotspot of the terminal is turned on or turned off, in a case where Hotspot of the terminal is judged to be turned on, ending, and in a case where Hotspot of the terminal is judged to be turned off, proceeding to S309; at S304, judging whether Hotspot of the terminal is turned on or turned off, in a case where Hotspot of the terminal is judged to be turned on, proceeding to S305, and in a case where Hotspot of the terminal is judged to be turned off, proceeding to S306; at S305, turning off Hotspot of the terminal; at S306, judging whether WIFI of the terminal is turned on or turned off, in a case where WIFI of the terminal is judged to be turned on, proceeding to S308, and in a case where WIFI of the terminal is judged to be turned off, proceeding to S307; at S307, turning on WIFI of the terminal; at S308, turning on Miracast of the terminal; at S309, turning on Hotspot of the terminal, and then ending.

Figure 4:
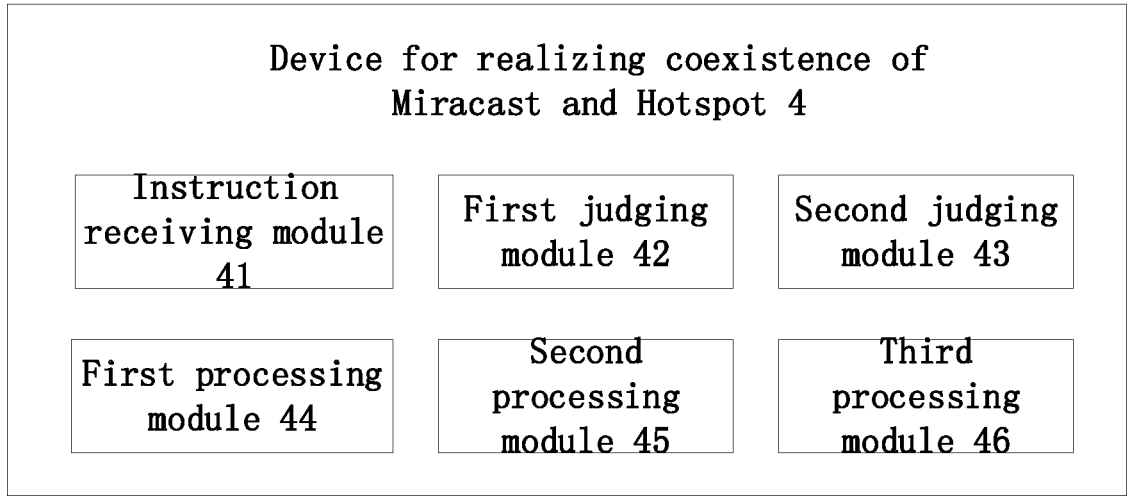
FIG. 4 shows a structural diagram of a device for realizing coexistence of Miracast and Hotspot in an embodiment of the present disclosure.

In order to achieve coexistence of Miracast and Hotspot to improve user's experiences, an embodiment of the present disclosure further provides a terminal for realizing coexistence of Miracast and Hotspot, which includes a device for realizing coexistence of Miracast and Hotspot, realizes coexistence of Miracast and Hotspot by the device for realizing coexistence of Miracast and Hotspot, and is implemented as a mobile phone, a personal computer (PC), a portable android device (PAD), a television, a projector or the like. Referring to FIG. 4, the device 4 for realizing coexistence of Miracast and Hotspot specifically includes: an instruction receiving module 41, a first judging module 42, a second judging module 43, a first processing module 44, a second processing module 45 and a third processing module 46. The instruction receiving module 41 is configured to receive the coexistence instruction. The first judging module 42 is configured to judge whether Miracast of the terminal is currently turned off upon receiving the coexistence instruction by the instruction receiving module 41. The second judging module 43 is configured to judge whether Hotspot of the terminal is currently turned on or turned off in a case where Miracast of the terminal is judged to be turned off by the first judging module 42. The first processing module 44 is configured to turn on Miracast of the terminal after turning off Hotspot of the terminal in a case where Hotspot of the terminal is judged to be turned on by the second judging module 43. The second processing module 45 is configured to directly turn on Miracast of the terminal in a case where Hotspot of the terminal is judged to be turned off by the second judging module 43. The third processing module 46 is configured to turn on Hotspot of the terminal after Miracast of the terminal is turned on by the first processing module 44 or the second processing module 45.

Figure 5:
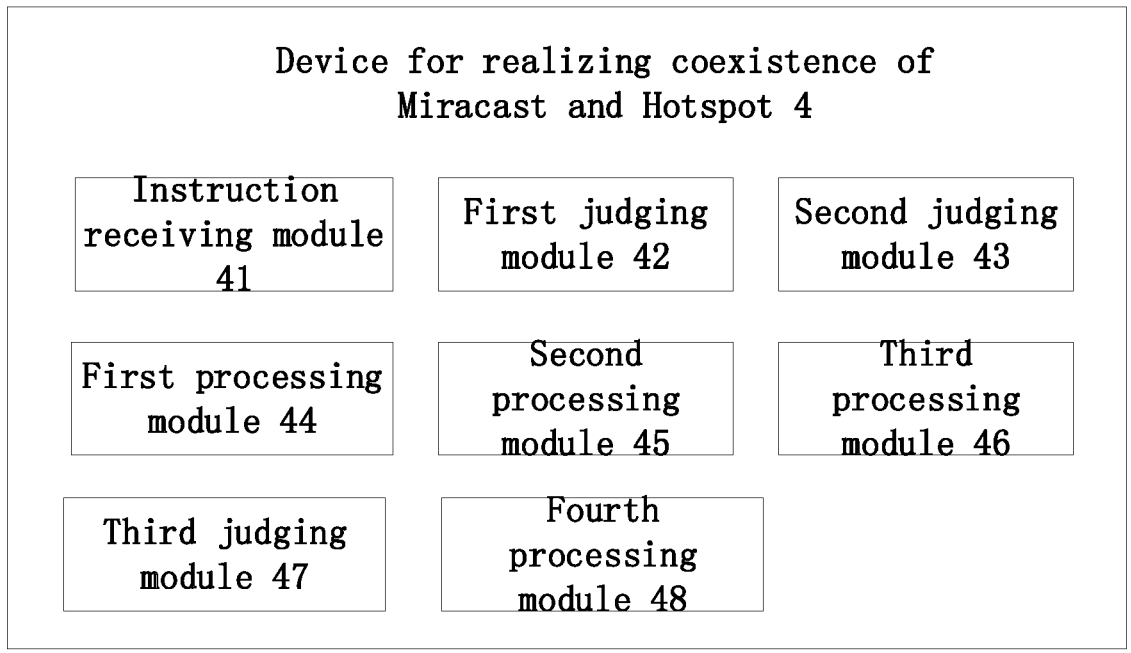
FIG. 5 shows another structural diagram of the device for realizing coexistence of Miracast and Hotspot in an embodiment of the present disclosure.

Referring to FIG. 5, in some implementations, the device for realizing coexistence of Miracast and Hotspot further includes a third judging module 47 and a fourth processing module 48. The third judging module 47 is configured to judge whether Hotspot of the terminal is turned off in a case where Miracast of the terminal is judged to be turned on by the first judging module 42. The fourth processing module 48 is configured to turn on Hotspot of the terminal in a case where Hotspot of the terminal is judged to be turned off by the third judging module 47.

It should be understood that, the third processing module 46 or the fourth processing module 48 is configured to build a peer-to-peer network group through a service set identifier and a password to achieve an access of a wireless access point.

Figure 6:
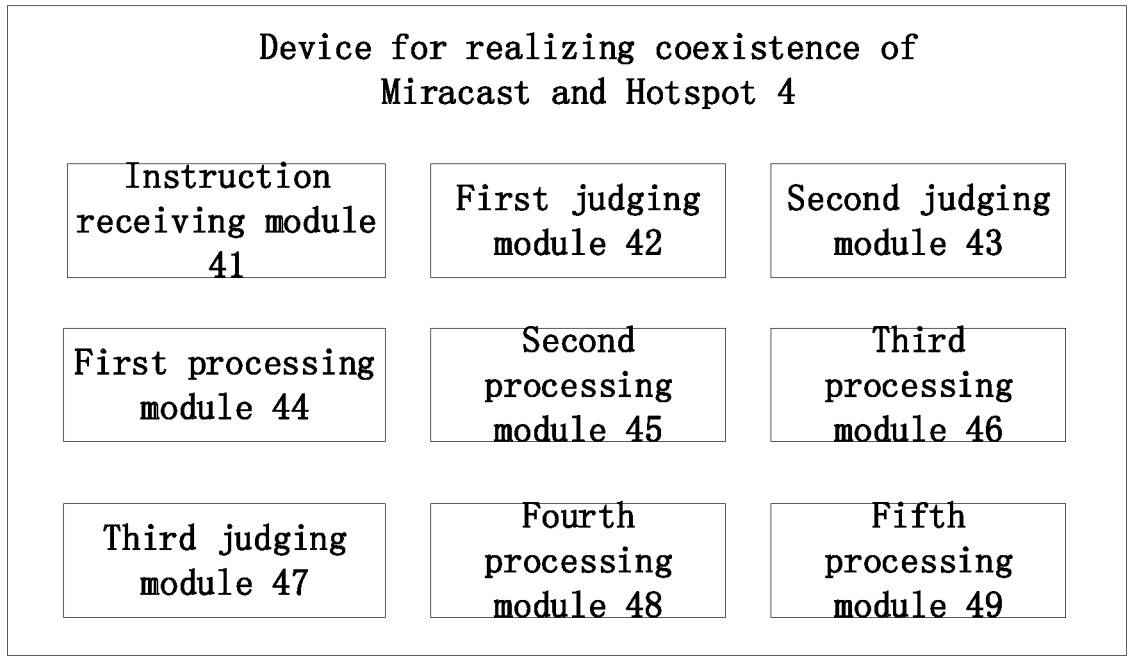
FIG. 6 shows still another structural diagram of the device for realizing coexistence of Miracast and Hotspot in an embodiment of the present disclosure.

Referring to FIG. 6, in some implementations, the device for realizing coexistence of Miracast and Hotspot further includes a fifth processing module 49 configured to turn on WIFI of the terminal before Miracast of the terminal is turned on by the first processing module 44 or the second processing module 45 in a case where WIFI of the terminal is currently turned off.

It should be understood that, the step of turning on Miracast of the terminal specifically includes: establishing a WIFI connection of P2P through WIFI, and forbidding WIFI scanning after Miracast is turned on.

An embodiment of the present disclosure provides a method for realizing coexistence of Miracast and Hotspot, which can judge a current situation of a terminal upon receiving a trigger instruction and freely switch on/off states of Miracast and Hotspot to realize coexistence of Miracast and Hotspot, which simplifies operations so that it is convenient for users to use, improving user's experiences and also making actual coexistence effects better. According to different situations of the terminal, specific procedures of the method for realizing coexistence of Miracast and Hotspot are as shown in FIGS. 7-9.

Figure 7:
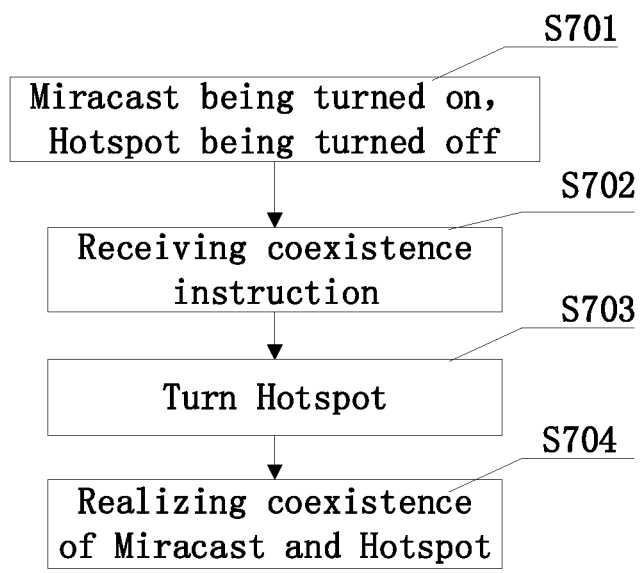
FIG. 7 shows a flowchart of realizing coexistence of Miracast and Hotspot in a case where Miracast of a terminal is turned on and Hotspot of the terminal is turned off in an embodiment of the present disclosure.

Referring to FIG. 7, a terminal is in a situation where Miracast of the terminal is turned on and Hotspot of the terminal is turned off, Hotspot of the terminal is directly turned on upon receiving a coexistence instruction, and the procedure for realizing coexistence of Miracast and Hotspot includes steps: at S701, judging a terminal being in a situation where Miracast of the terminal is turned on and Hotspot of the terminal is turned off; at S702, receiving the coexistence instruction; at S703, turning on Hotspot of the terminal; at S704, realizing coexistence of Miracast and Hotspot.

Figure 8:
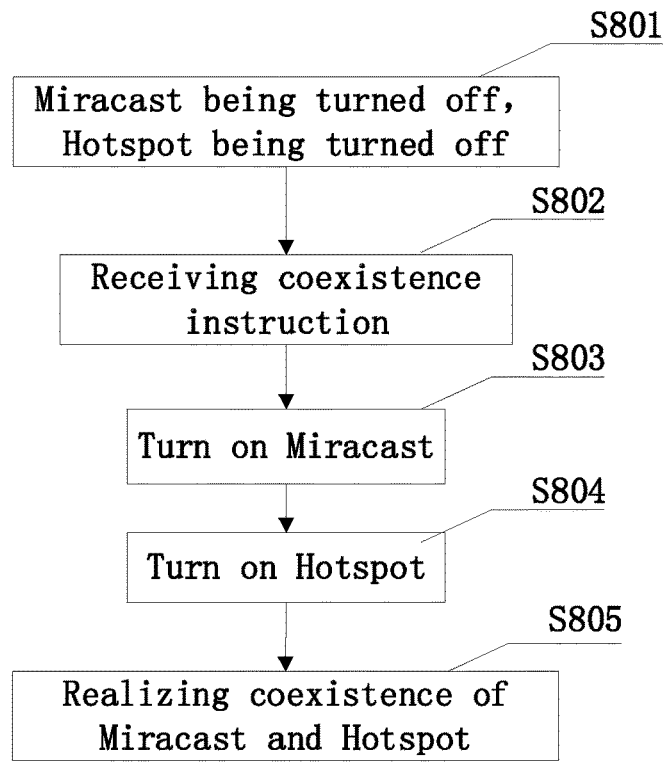
FIG. 8 shows a flowchart of realizing coexistence of Miracast and Hotspot in a case where Miracast of a terminal is turned off and Hotspot of the terminal is also turned off in an embodiment of the present disclosure.

Referring to FIG. 8, a terminal is in a situation where Miracast of the terminal is turned off and Hotspot of the terminal is turned off, Miracast of the terminal is first turned on upon receiving the coexistence instruction, and then Hotspot of the terminal is turned on, and the procedure for realizing coexistence of Miracast and Hotspot includes steps: at S801, judging a terminal being in a situation where Miracast of the terminal is turned off and Hotspot of the terminal is turned off; at S802, receiving the coexistence instruction; at S803, turning on Miracast of the terminal; at S804, turning on Hotspot of the terminal; at S805, realizing coexistence of Miracast and Hotspot.

Figure 9:
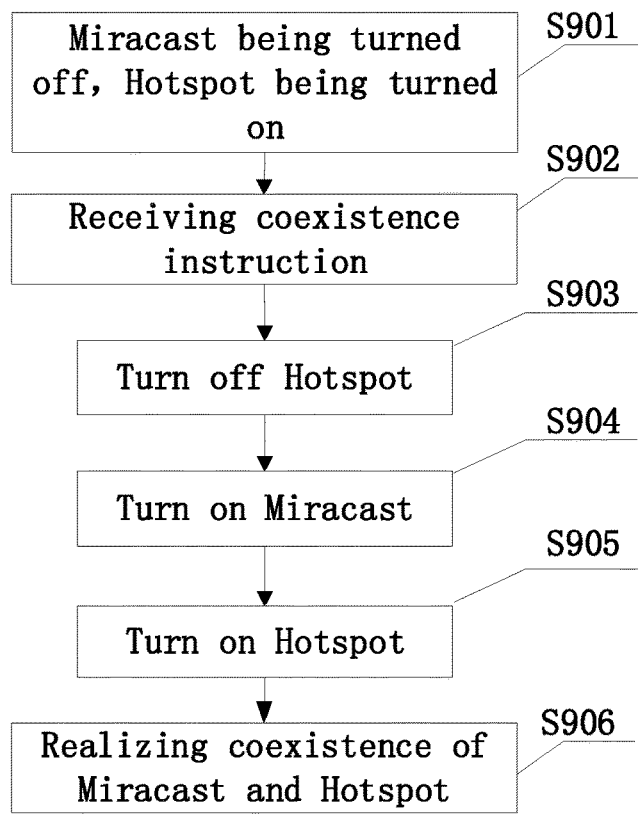
FIG. 9 shows a flowchart of realizing coexistence of Miracast and Hotspot in a case where Miracast of a terminal is turned off and Hotspot of the terminal is turned on in an embodiment of the present disclosure.

Referring to FIG. 9, a terminal is in a situation where Miracast of the terminal is turned off and Hotspot of the terminal is turned on, Hotspot of the terminal is first turned off upon receiving the coexistence instruction, and then Miracast of the terminal is turned on and Hotspot of the terminal is subsequently turned on, and the procedure for realizing coexistence of Miracast and Hotspot includes steps: at S901, judging a terminal being in a situation where Miracast of the terminal is turned off and Hotspot of the terminal is turned on; at S902, receiving the coexistence instruction; at S903, turning off Hotspot of the terminal; at S904, turning on Miracast of the terminal; at S905, turning on Hotspot of the terminal; at S906, realizing coexistence of Miracast and Hotspot.

It should be understood that, when a terminal is in a situation where Miracast of the terminal is turned on and Hotspot of the terminal is turned on, it indicates that Miracast and Hotspot of the terminal are coexistent before receiving the coexistence instruction.

Technical solutions of the present disclosure are illustrated in detail by above descriptions in conjunction with specific implementations, but the present disclosure is not limited thereto. A person of ordinary skill in the art can further make various simple deductions or substitutions without departing from the essence of the present disclosure, any of these deductions or substitutions should fall into the protection scope of the present disclosure.

INDUSTRIAL APPLICABILITY

As described above, embodiments of the present disclosure provide a method, a device and a terminal for realizing coexistence of Miracast and Hotspot, which solves a problem that coexistence of Miracast and Hotspot has not been achieved in related technologies. With technical solutions of the present disclosure, a terminal receives a trigger instruction in different situations to achieve coexistence of Miracast and Hotspot of the terminal, which simplifies operations so that it is convenient for users to use, improving user's experiences and also making actual coexistence effects better.

What is claimed is:
1. A method for realizing coexistence of Miracast and Hotspot, comprising:
receiving a coexistence instruction;

turning off Hotspot of a terminal and then turning on Miracast of the terminal in response to Miracast of the terminal being turned off and Hotspot of the terminal being turned on, and directly turning on Miracast of the terminal in response to Miracast of the terminal being turned off and Hotspot of the terminal being turned off; and turning on Hotspot of the terminal in response to Miracast of the terminal being turned on.

2. The method of claim 1, wherein the turning on Hotspot of the terminal comprises: building a peer-to-peer network group through a service set identifier and a password to achieve an access of a wireless access point.

3. The method of claim 1, further comprising:
before turning on Miracast of the terminal, turning on wireless fidelity of the terminal in response to wireless fidelity of the terminal being turned off.

4. The method of claim 2, further comprising:
before turning on Miracast of the terminal, turning on wireless fidelity of the terminal in response to wireless fidelity of the terminal being turned off.

5. A terminal for realizing coexistence of Miracast and Hotspot, configured to:

receive a coexistence instruction;
turn off Hotspot of the terminal and then turn on Miracast of the terminal in response to Miracast of the terminal being turned off and Hotspot of the terminal being turned on and directly turn on Miracast of the terminal in response to Miracast of the terminal being turned off and Hotspot of the terminal being turned off; and turn on Hotspot of the terminal in response to Miracast of the terminal being turned on.

6. The terminal of claim 5, further configured to build a peer-to-peer network group through a service set identifier and a password to achieve an access of a wireless access point.

7. The terminal of claim 5, further configured to turn on wireless fidelity of the terminal in response to wireless fidelity of the terminal being turned off before Miracast of the terminal is turned on.

8. The terminal of claim 6, further configured to turn on wireless fidelity of the terminal in response to wireless fidelity of the terminal being turned off before Miracast of the terminal is turned on.

\* \* \* \* \*